(12) United States Patent
Ikeda

(10) Patent No.: US 7,124,855 B2
(45) Date of Patent: Oct. 24, 2006

(54) FLOW CONTROLLING APPARATUS FOR POWER STEERING

(75) Inventor: Tsuyoshi Ikeda, Chiryu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/872,432

(22) Filed: Jun. 22, 2004

(65) Prior Publication Data

US 2005/0000750 A1 Jan. 6, 2005

(30) Foreign Application Priority Data

Jun. 23, 2003 (JP) ............... 2003-177711

(51) Int. Cl.
  *B62D 5/06* (2006.01)
(52) U.S. Cl. .................. 180/423; 180/421
(58) Field of Classification Search ......... 180/421–423
  See application file for complete search history.

(56) References Cited

U.S. PATENT DOCUMENTS 4,557,342 A * 12/1985 Drutchas .................. 180/422
4,576,003 A * 3/1986 Rau et al. .................. 60/384
5,207,239 A 5/1993 Schwitalla et al.
5,508,919 A * 4/1996 Suzuki et al. ............ 180/422
6,179,082 B1 1/2001 Ikari

FOREIGN PATENT DOCUMENTS

| EP | 1108638 A1 | 6/2001 |
| EP | 1331156 | 7/2003 |
| JP | 2001260917 | 9/2001 |

* cited by examiner

*Primary Examiner*—Lesley D. Morris
(74) *Attorney, Agent, or Firm*—Oblon, Spivak, McClelland, Maier & Neustadt, P.C.

(57) ABSTRACT

A flow controlling apparatus for a power steering system includes a variable throttle mechanism installed in the pump to change the flow rate of discharged oil from the pump to a hydraulic device; a linear solenoid mechanism controlling the variable throttle mechanism by a predetermined energizing current; a spool feeding back the excess discharged oil to a bypass passage of the pump in accordance with a differential pressure between the upstream and downstream sides of the variable throttle mechanism when the excess fluid exceeds a predetermined value; and an ECU controlling the energized current to change the transition process in accordance with a steering angular velocity of the steering wheel.

3 Claims, 4 Drawing Sheets

FLOW CONTROLLING APPARATUS FOR POWER STEERING

INCORPORATION BY REFERENCE

The present application claims priority under 35 U.S.C. §119 to Japanese Patent Applications No. 2003-177711, filed on Jun. 23, 2003. The content of this application is incorporated herein by reference in its entirety.

BACKGROUND OF THE INVENTION

1. Field of the Invention

The present invention relates to a flow controlling apparatus for a power steering system which constantly supplies operational oil from an oil pump to a hydraulic device to assist a steering wheel of a vehicle by hydraulic power.

2. Description of the Related Art

It is well known for a flow controlling apparatus for a power steering system to output a predetermined volume of the discharged operational oil to a hydraulic device in accordance with a vehicle speed or a steering angle of a steering wheel, for example as shown in Japanese laid-open patent publication No. 2001-163233. In this related art, the discharged fluid is controlled by a variable valve equipped in an outlet of the flow controlling apparatus by energizing a solenoid. The solenoid is controlled by an electric signal relating to the vehicle speed or the steering angle through control means such as a micro computer. The solenoid is energized in accordance with the electric signal to operate the variable valve in order to control the amount of fluid to the hydraulic device of the power steering system.

In the well known power steering system, since the solenoid is energized in accordance with the electric signal relating to the vehicle speed or the steering angle of the steering wheel to operate the variable valve in order to control the amount of fluid supplied to the hydraulic device of the power steering system, it is best for energy saving that the amount of discharged fluid is zero where the steering is judged to be not operated by judging the steering angle. However, where the amount of discharged fluid is zero, seizure of the hydraulic device or unsteady driving based on a disturbance such a kick-back and so on in a straight run can occur. Further, it requires time during rapid steering for the discharged fluid volume to increase to a suitable amount, causing delayed response of power assistance by the hydraulic device. Because of this reason, the well known flow controlling apparatus keeps a minimum flow of fluid discharged to the hydraulic device of the power steering as standby fluid when waiting to assist the steering wheel. Therefore, it is easy to reach the predetermined amount of fluid from the standby fluid amount even for rapid steering. The well known electrically controlled flow controlling device provides only a single way of transition from standby amount of fluid Qs to a suitable amount of fluid (Qa) needed for assisting the hydraulic device, that is to say the time constant relating to an increase from Qs to Qa is only a single value, as shown in FIG. 1. Therefore, where the time constant is set for rapid steering in the control means, the assisting force suddenly and unexpectedly rises at slow steering, thereby making the driver feel uncomfortable.

SUMMARY OF THE INVENTION

In view of the previously mentioned circumstances, it is an object of the present invention to provide a flow controlling apparatus for a power steering system which prevents the driver from feeling uncomfortable.

In order to achieve the above and other objects, the present invention provides that the flow controlling apparatus for the power steering system includes control means to change the transition from standby fluid for waiting to assist the steering wheel to assisting fluid to assist the steering wheel by hydraulic power, in accordance with a steering angular velocity of the steering wheel. The transition process from the standby fluid flow to the assisting fluid flow is easily changed so that it does not make the driver feel uncomfortable and therefore supplies the assisting force effectively.

A second aspect of the flow controlling apparatus for the power steering of the present invention is that said control means controls in such a way that the transition process is rapid when the steering angular velocity is large, and is slow when the steering angular velocity is small. More particularly, another aspect of the flow controlling apparatus for the power steering is that said control means time constant small in value so that the transition process is rapid when the steering angular velocity is large, and is large in value so that the transition process is slow when the steering angular velocity is small. By this construction of the present invention, at rapid steering the transition from standby fluid to assisting fluid is performed swiftly so that suitable power assistance is provided. Thereby, the driver does not feel a rapid increasing of torque response force and smooth power assistance is performed. At slow steering the transition from standby fluid to assisting fluid is performed slowly so that the assisting force is not applied rapidly. Thereby, the driver does not feel uncomfortable.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

Figure 1:
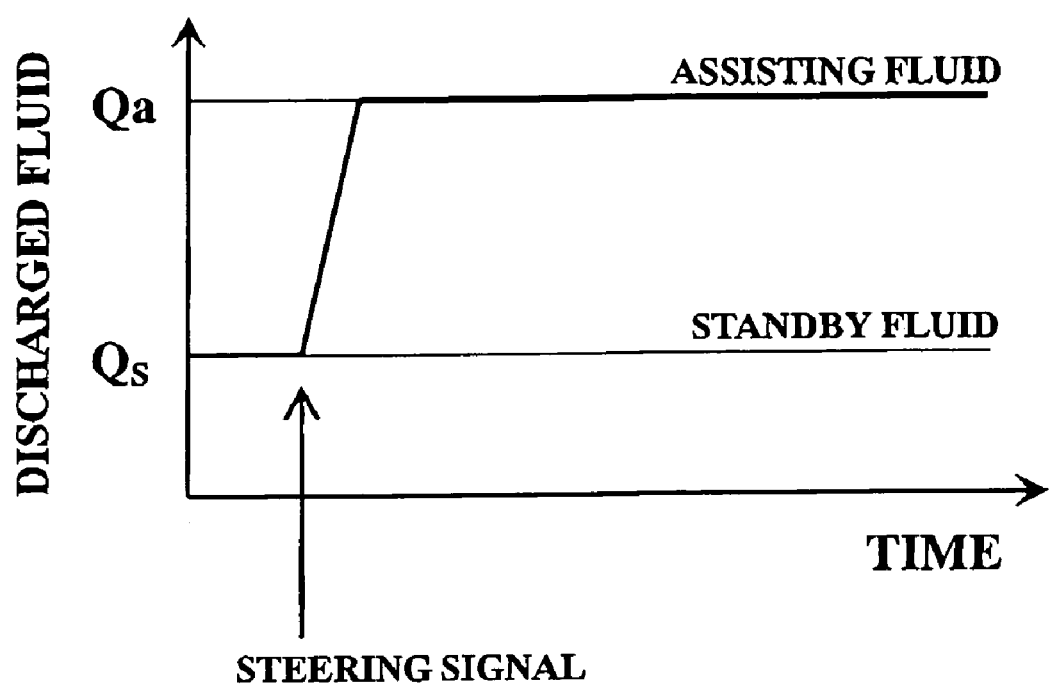
FIG. 1 is a graph showing the operational situation in a related art.
Figure 2:
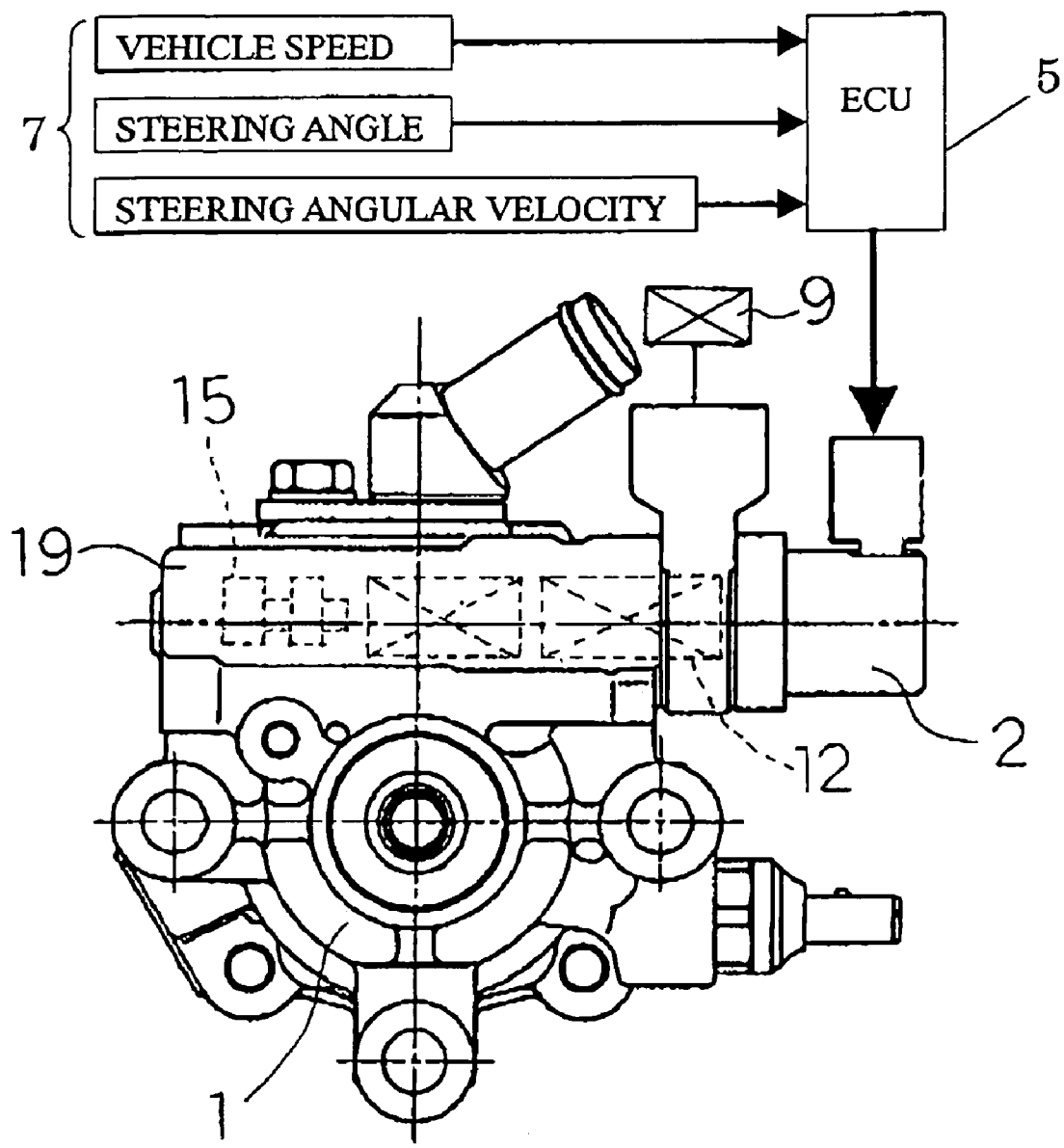
FIG. 2 is an explanatory drawing of one embodiment of the present invention.

A preferred embodiment of a flow controlling apparatus for a power steering according to the present invention will be described referring to FIG. 2 to FIG. 4. In FIG. 2, the power steering includes a hydraulic device 9 which receives pressurized discharged operating oil from a pump 1 through the flow controlling apparatus in order to assist a rotation of a steering wheel of a vehicle by hydraulic power. The flow controlling apparatus controls discharged oil suitably to feed to the hydraulic device 9 and is installed in an outlet portion of the pump 1 through which the pump 1 outputs the discharged oil. The flow controlling apparatus comprises mainly a variable throttle mechanism 12, a spool 15 and an ECU (control means) 5. The variable throttle mechanism 12 is controlled by a linear solenoid mechanism 2 in correspondence to a predetermined value of an energized current. When a volume of discharged oil from the pump 1 to the hydraulic device 9 is exceeds a predetermined value, the spool 15 feeds back the exceeded discharged oil to a bypass passage 17 in accordance with the differential pressure between the upstream and downstream sides of the variable throttle mechanism 12. The bypass passage 17 is provided to connect to an inlet port of the pump 1. The ECU 5 controls the energization current to the linear solenoid mechanism 2 suitably in correspondence with the running state of the vehicle or steering state of the steering wheel.

Figure 3:
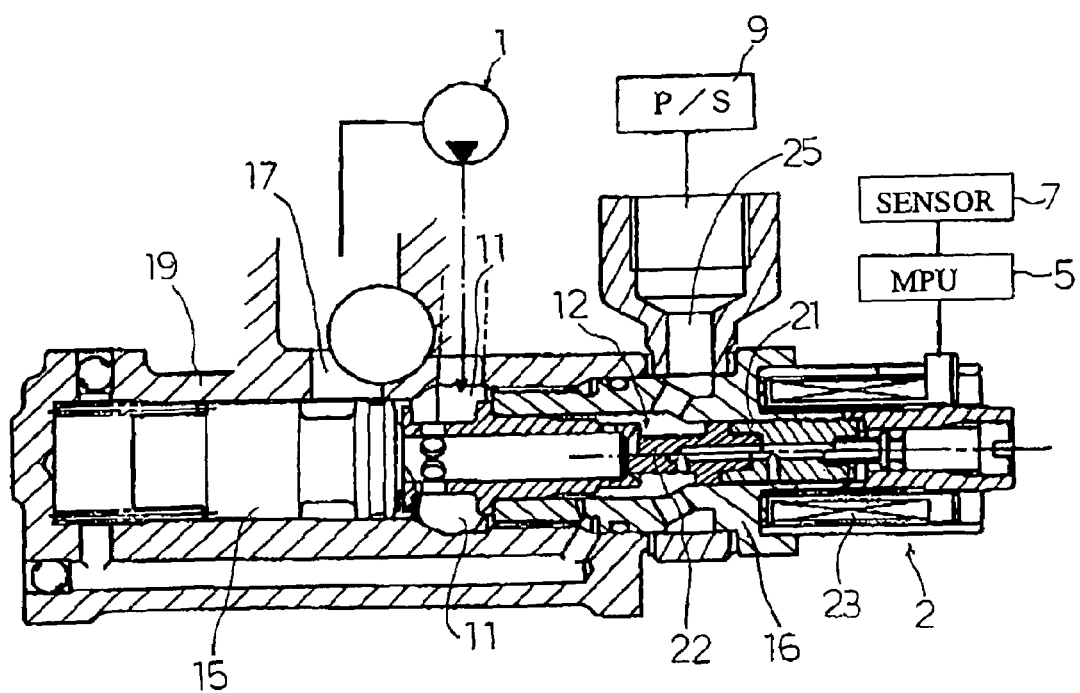
FIG. 3 is a vertical sectional view of a variable throttle mechanism and a solenoid mechanism comprising main portions of one embodiment of the present invention.
Figure 4:
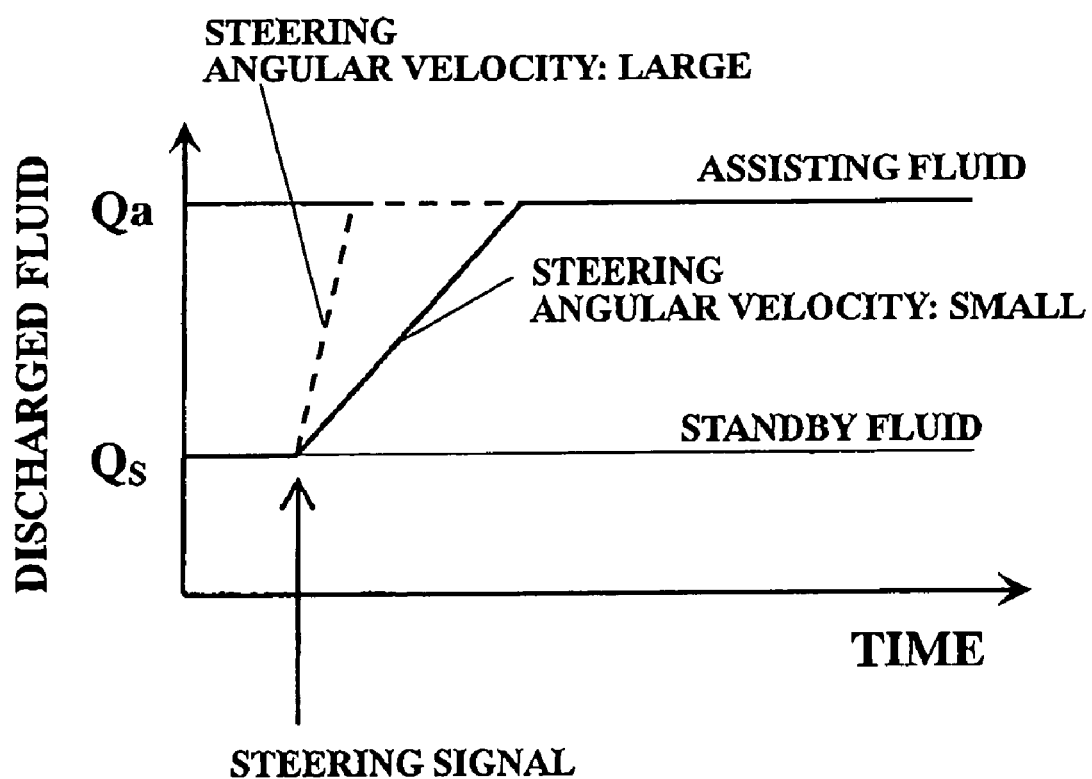
FIG. 4 is a graph showing the operational situation in one embodiment of the present invention.

The spool 15, the variable throttle mechanism 12 and other components are installed in a housing of the pump 1, as shown in FIG. 3. The spool 15 is slidably mounted in the housing 19 in order to feed mainly discharged oil from the pump 1 through an introducing chamber 11 formed in a side of the head of the spool 15 to the hydraulic device 9 and feed back the excess discharged oil from the pump 1 to the bypass passage 17. The linear solenoid mechanism 2 is mounted on a union 16 at one end of the housing 19 having the bypass passage 17 and so on. Mounted in the union 16 is the variable throttle mechanism 12, the opening degree of which is controlled by the linear solenoid mechanism 2. Around the variable throttle mechanism 12 is an outlet 25 through which controlled discharged oil is discharged to the hydraulic device 9 of the power steering system. The spool 15 is operated according to the differential pressure between the upstream and downstream sides of the variable throttle mechanism 12 in order that excess discharged oil is fed back to the bypass passage 17.

The linear solenoid mechanism 2 comprises a valve body 22 forming the variable throttle mechanism 12; a movable armature core 21 connected to the valve body 22; coils 23 mounted outward the movable armature core 21 to move the armature core slidably; and an unillustrated spring to hold the movable armature core 21 in a desired position in accordance with the amount of energization current provided to the coils 23. The ECU 5 inputs the energization current to coils 23 of the solenoid mechanism 2 in order to control operations of the linear solenoid mechanism 2, as shown in FIG. 2. Into the ECU are 5 are fed various signals from a vehicle speed sensor, a steering angle sensor of the steering wheel, and a steering angular velocity sensor of the steering wheel, to perform predetermined calculations. The ECU 5 is constructed by a micro-computer with a micro processor (MPU), performing predetermined calculation based on read only memory (ROM) data input previously. After receiving and calculating input signals, the ECU 5 orders a predetermined energization current to the linear solenoid mechanism 2.

The operation of the embodiment of the present invention will be described hereinafter referred to FIGS. 2 and 4. After the pump 1 is operated to start, discharged oil from the pump 1 is introduced into the introducing chamber 11 and thereafter fed into the hydraulic device 9 of the power steering system via the variable throttle mechanism 12 controlled by the linear solenoid mechanism 2, and the outlet 25, thereby assisting the steering wheel of the vehicle with hydraulic power. At that time, where the turning velocity of the pump rotor is increased to discharge the discharged oil exceeding the predetermined value, the excess discharged oil is fed back to the bypass passage 17 shown in FIG. 3. Therefore, fluid discharged from the outlet 25 is maintained constant. This means constant fluid control for the pump. The constant fluid flow rate is determined by predetermined calculation by the ECU 5 based on information from various sensors 7 including the vehicle speed sensor, etc.

It is conventional for an electrically controlled flow controlling device to provide a predetermined standby fluid Qs from a flow controlling device in order to prevent seizure in the hydraulic device, unsteady driving in a straight run, delayed response of power assistance by the hydraulic device, and so on. In this standby stage, after a steering wheel is operated, a linear solenoid mechanism is operated to supply a suitable amount of fluid (Qa) needed for assistance by the hydraulic device on the basis of commands from the ECU, thereby discharging the suitable amount of fluid to the hydraulic device of the power steering system for assisting the steering wheel by hydraulic fluid. In the related art of the flow controlling apparatus of the well known power steering, the transition process from the standby fluid (Qs) to assisting fluid (Qa) is constant or stable, that is to say there is only a single time constant for the rise from Qs to Qa. Therefore, where the time constant is set to a relatively small value for rapid steering control, the assisting force is suddenly and unexpectedly raised during slow steering, thereby to make the driver feel uncomfortable. On the contrary, where the time constant is set to a relatively large value for slow steering control, a suitable assisting force is not applied immediately during rapid steering, thereby causing a shocked steering response.

In order to solve these problem in the related art, in the embodiment of the present invention the ECU 5 changes the time constant of the rise from Qs to Qa in accordance with the angular velocity of the steering wheel. The embodiment of the present invention changes the value of the transition from the standby fluid (Qs) to assisting fluid (Qa) to set the time constant as a small value at a large steering angular velocity as shown by a dotted line in FIG. 4, and to set said time constant as a large value at the small steering angular velocity as shown by a solid line in FIG. 4. By these settings of the value of time constant, at rapid steering the transition from standby fluid to assisting fluid is performed swiftly so that the suitable power assistance is provided. Thereby, the driver does not feel uncomfortable based on a rapid increasing of torque response force, and smooth power assistance is performed. At slow steering the transition from standby fluid to assisting fluid is performed slowly so that the assisting force is not applied rapidly. Thereby, the driver does not feel uncomfortable. In detailed operation, the ECU 5 controls the energization current as 0.2 A (ampere) to the coils 23, thereby to move the movable armature core 21 so that a relatively small standby opening degree of the variable throttle mechanism 12 is kept in order to keep the discharged standby fluid Qs from the outlet 25 at 2 l/min. And the ECU 5 controls the energization current as 0.8 A (ampere) to the coils 23 thereby to move the movable armature core 21 so that relatively large amount of the opening degree of the variable throttle mechanism 12 is kept in order to keep the discharged assisting fluid Qa from the outlet 25 at 8 l/min. for assisting the rotation of the steering wheel by hydraulic power. In the transition process from Qs to Qa, the ECU 5 changes the energized current from 0.2 A to 0.8 A continuously with the above-described predetermined time constant which is unchangeable during this identified transition process. FIG. 3 shows only two types of transition for easy understanding, however the ECU 5 changes continuously the value of time constant according to the variation of the steering angular velocity.

While the invention has been described in detail with reference to the preferred embodiment, it will be apparent to those skilled in the art that the invention is not limited to the present embodiment, and that the invention may be realized in various other embodiments within the scope of the claims. For example, in the above-mentioned embodiment of the present invention, the time constant is changed by the ECU 5 according to the steering angular velocity, however it may be changed in accordance with the vehicle speed or the steering angle.

Furthermore, the technological components described in this specification and illustrated in the drawings can demonstrate their technological usefulness independently through various other combinations which are not limited to the combinations described in the claims made at the time of application. Moreover, the art described in this specification and illustrated in the drawings can simultaneously achieve a plurality of objectives, and is technologically useful by virtue of realizing any one of these objectives.

What is claimed is:

1. A flow controlling apparatus for a power steering system, comprising:
   a pump;
   a hydraulic device receiving discharged oil from said pump to assist a steering wheel by hydraulic power;
   a variable throttle mechanism installed in said pump to change a flow rate of said discharged oil from said pump to said hydraulic device;
   a linear solenoid mechanism controlling said variable throttle mechanism according to a predetermined energizing current;
   a spool feeding back excess discharged oil to a bypass passage of said pump in accordance with a differential pressure between upstream and downstream sides of said variable throttle mechanism when said excess fluid exceeds a predetermined value; and
   control means for controlling said energizing current to cause said variable throttle mechanism to transition from providing a standby flow rate of said discharged oil to providing an assist flow rate of said discharged oil in accordance with a steering angular velocity of said steering wheel when it is determined that said steering wheel is being turned, wherein said control means controls said energizing current to more rapidly increase said transition from a standby flow rate to an assist flow rate when said steering angular velocity is large, and to more slowly increase said transition from a standby flow rate to an assist flow rate when said steering angular velocity is small, and wherein said control means sets a time constant of an increase of the energizing current to have a small value so that said transition is rapid when said steering angular velocity is large, and sets the time constant to have a large value so that said transition is slow when said steering angular velocity is small.

2. A flow controlling apparatus for a power steering system, comprising:
   a pump;
   a hydraulic device receiving discharged oil from said pump to assist a steering wheel by hydraulic power;
   a variable throttle mechanism installed in said pump to change a flow rate of said discharged oil from said pump to said hydraulic device;
   a linear solenoid mechanism controlling said variable throttle mechanism according to a predetermined energizing current;
   a spool feeding back excess discharged oil to a bypass passage of said pump in accordance with differential pressure between upstream and downstream sides of said variable throttle mechanism when said excess fluid exceeds a predetermined value; and
   control means for controlling said energizing current to cause said variable throttle mechanism to transition from providing a standby flow rate of said discharged oil to providing an assist flow rate of said discharged oil in accordance with a speed of said steering wheel when it is determined that said steering wheel is being turned, wherein said control means controls said energizing current to more rapidly increase said transition from a standby flow rate to an assist flow rate when said steering wheel speed is large, and to more slowly increase said transition from a standby flow rate to an assist flow rate when said steering wheel speed is small, and wherein said control means sets a time constant of an increase of the energizing current to have a small value so that said transition is rapid when said steering wheel speed is large, and sets a time constant to have a large value so that said transition is slow when said steering wheel speed is small.

3. A flow controlling apparatus for a power steering system comprising:
   a pump;
   a hydraulic device receiving discharged oil from said pump to assist a steering wheel by hydraulic power;
   a variable throttle mechanism installed in said pump to change a flow rate of said discharged oil from said pump to said hydraulic device;
   a linear solenoid mechanism controlling said variable throttle mechanism according to a predetermined energizing current;
   a spool feeding back excess discharged oil to a bypass passage of said pump in accordance with differential pressure between upstream and downstream sides of said variable throttle mechanism when said excess fluid exceeds a predetermined value; and
   control means for controlling said energizing current to cause said variable throttle mechanism to transition from providing a standby flow rate of said discharged oil to providing an assist flow rate of said discharged oil in accordance with a steering angle of said steering wheel when it is determined that said steering wheel is being turned, wherein said control means controls said energizing current to more rapidly increase said transition from a standby flow rate to an assist flow rate when said steering angle is large, and to more slowly increase said transition from a standby flow rate to an assist flow rate when said steering angle is small, and wherein said control means sets a time constant of an increase of the energizing current to have a small value so that said transition is rapid when said steering angle is large, and sets a time constant to have a large value so that said transition is slow when said steering angle is small.

* * * * *